Dec. 4, 1951 A. T. HILL 2,577,246
TRAILER HAVING A VERTICALLY MOVABLE BODY
Filed Oct. 11, 1948 2 SHEETS—SHEET 1

A. T. Hill INVENTOR
BY C. A. Snow & Co.
ATTORNEYS.

Dec. 4, 1951 — A. T. HILL — 2,577,246
TRAILER HAVING A VERTICALLY MOVABLE BODY
Filed Oct. 11, 1948 — 2 SHEETS—SHEET 2
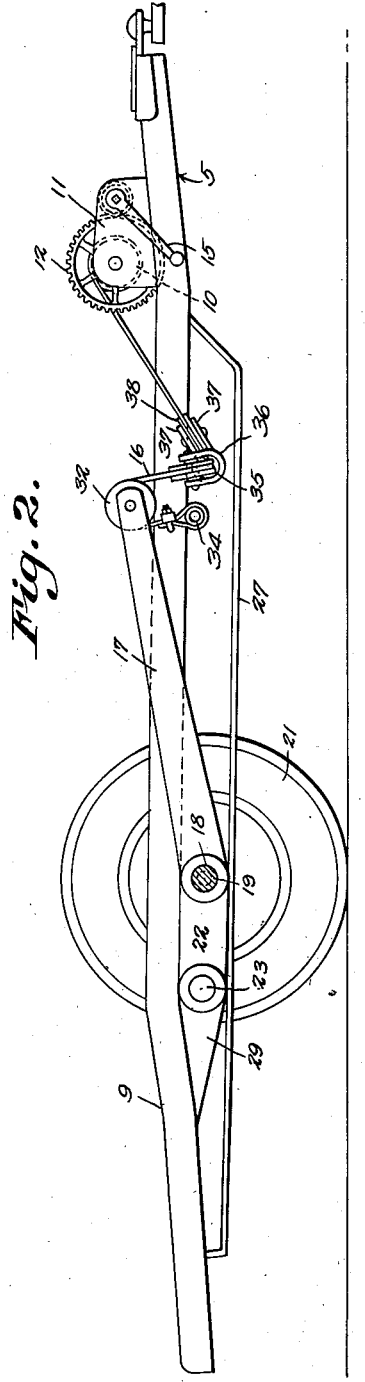
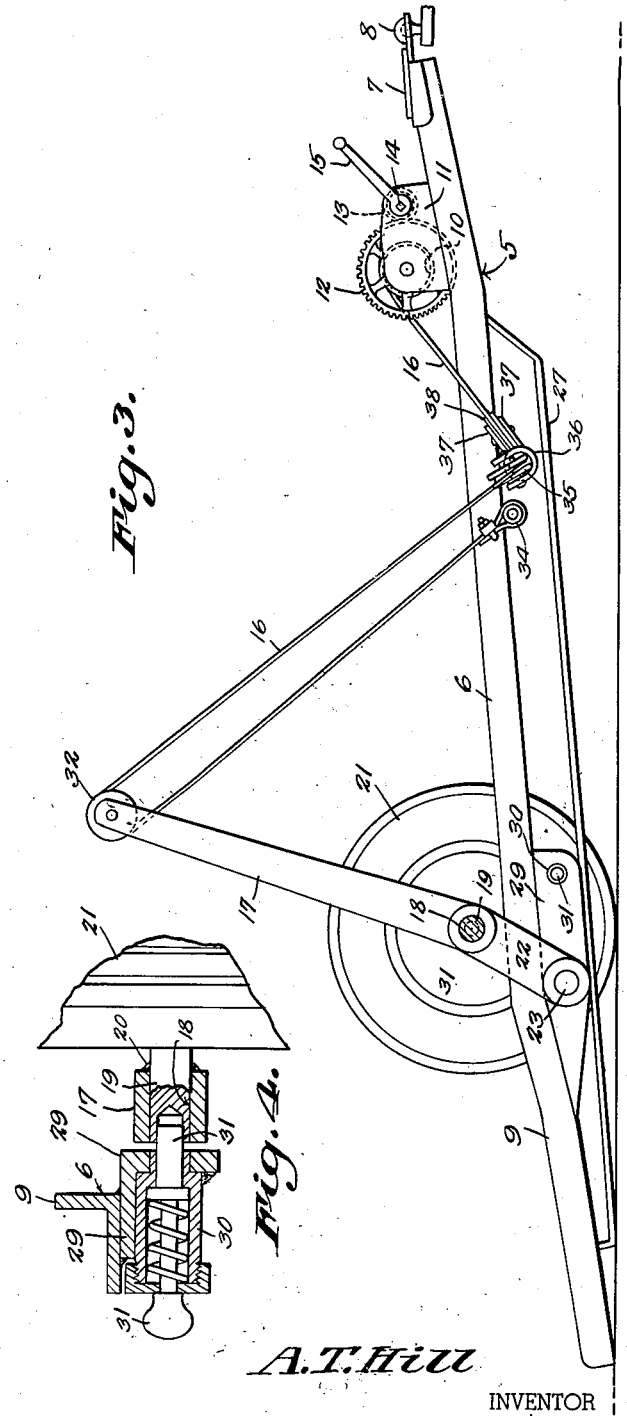
A. T. Hill
INVENTOR
BY C. A. Snow & Co.
ATTORNEYS.

Patented Dec. 4, 1951

2,577,246

UNITED STATES PATENT OFFICE 2,577,246

TRAILER HAVING A VERTICALLY MOVABLE BODY

Arthur T. Hill, San Antonio, Tex., assignor to H. W. Lewis Equipment Co., San Antonio, Tex.

Application October 11, 1948, Serial No. 53,804

2 Claims. (Cl. 214—85)

1

In trailers of known construction, used in carrying heavy cargoes, and which are of the standard fixed body type, or which are designed for permitting the load carrying surface or trailer bed to be lowered to the ground at the rear, to facilitate loading or unloading of heavy cargoes, such as road machines, bulky and awkward cargoes, such trailers require a special form of ramp or lifting device for loading.

When the form of the trailer having the vertically movable trailer bed is used, since the load carrying surface or trailer bed must always be near or above the axle of the wheels, the degree of inclination of the bed for a trailer of given length is much greater than that of the type of trailer forming the subject matter of the present invention, which precludes driving a self-propelled vehicle with steel wheels, such as a road machine, onto the trailer.

It is, therefore, the primary object of the present invention to provide a trailer of this character, wherein the trailer body may be lowered to the ground to a substantially horizontal position from the point of the hitching device of the trailer, thereby providing a much more gradual sloping surface over which the machine or cargo is to be moved.

Still another object of the invention is to provide self containing means for operating the trailer bed to lift the same, the operating means being such as to require the minimum amount of exertion on the part of the operator in lifting the body of the trailer and its load.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 2 is a side elevational view of the trailer with one of the supporting wheels removed and illustrating the trailer in its elevated or carrying position.

Fig. 3 is an elevational view of the trailer with one of the supporting wheels removed, the body of the trailer being in its lowermost or loading position.

Fig. 4 is an enlarged sectional view taken on line 4—4 of Fig. 1.

2

Figure 1:
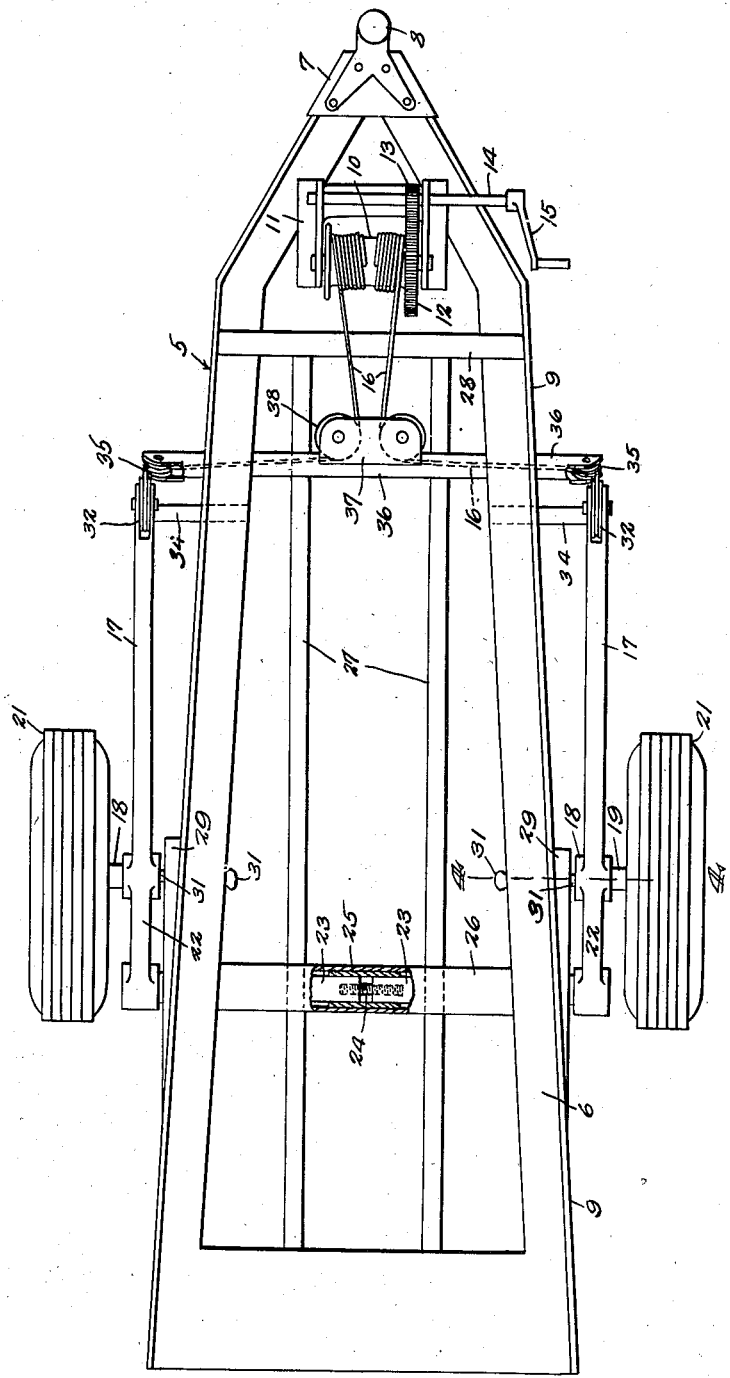
Figure 1 is a plan view of a trailer constructed in accordance with the present invention.

Referring to the drawings in detail, the trailer comprises a main frame or body portion indicated generally by the reference character 5, the body portion comprising side members 6 that converge towards the front end thereof, where they are connected by means of the plate 7 that carries the trailer hitch 8 by means of which the trailer may be connected with the towing truck or prime mover, the hitch maintaining the forward end of the trailer at a predetermined height.

Flanges 9 are formed along the outer longitudinal edges of the side members 6 and act as guides to guide a road machine onto a trailer.

The forward end of the main frame or body portion provides a support for the windlass 10, which is mounted on the frame 11, the windlass having the gear 12 at one end thereof, the gear 12 meshing with the gear 13 secured to the shaft 14, that in turn has the crank handle 15 secured to one end thereof. As the shaft 14 is rotated, the windlass will also be rotated to either wind or unwind the cables 16 from the windlass 10. The body portion lifting frame comprises side bars 17 that are formed with openings 18 disposed in spaced relation with the rear ends of the side bars, into which openings the stub axles 19 are secured as by welding, indicated at 20. These axles 19 provide mountings for the wheels 21 which rotate thereon, and are secured to the axles in the usual and well known manner.

The rearwardly extended ends 22 of the side bars 17, connected with the shafts 23 that have their inner ends spaced apart and secured together by means of the stud 24 which is threaded and positioned in threaded bores formed in the adjacent ends of the shafts 23. A sleeve 25 is positioned over the adjacent ends of the shafts 23, and this sleeve provides a support for the hollow shaft 26 which is secured thereto, the ends of the hollow shaft 26 providing a support on which the side members 6 of the main frame or body portion rest. The reference character 27 indicates truss bars that extend from the cross bar 28 connected to the side member 6 of the frame adjacent to the front end thereof. The rear ends of the truss bars 27 extend upwardly and connect with the rear of the main frame or body portion.

Welded to the under surfaces of the side members 6 of the frame, are short angle bars 29 that have openings to receive the ends of the hollow shaft 26 which is secured thereto and in which the shafts 23 move, the shafts 23 being connected to the side bars 17 at their rear ends.

The short angle bars 29 provide supports for the tubular mountings 30 in which the spring pressed securing pins 31 operate, the pins 31 being arranged so that they will extend into openings formed in the inner ends of the stub axles 19, as shown by Fig. 4 of the drawings, securing the main frame or body portion in its elevated position, it being obvious that as the main frame or body portion is elevated, the pins 31 will fall directly opposite to the openings in the ends of the stub shafts.

As clearly shown by Fig. 2 of the drawings, the side bars 17 have their forward portions extended slightly upwardly from the point where they support the stub axles, and at the forward free ends of the side bars 17 are pulleys 32 over which the cables 16 operate, the cables 16 having one of their respective ends anchored to the main frame at 34. These cables 16 also move over pulleys 35 mounted in the split ends of the tube 36, which tube is welded to the lower surfaces of the side members 6, adjacent to the forward end of the main frame.

Spaced upper and lower plates 37 are secured to the tube 36 at a point intermediate the ends thereof, which plate provides supports for the pulleys 38, over which the cables 16 also move in passing to the windlass 10.

From the foregoing it will be seen that due to the construction shown and described, when the main frame or body portion 5 is in its supporting position, as shown by Fig. 2, and it is desirable to lower the main frame to the position shown by Fig. 3, so that a heavy road machine may be driven thereon, it is only necessary to release the cable by rotating the windlass in an anti-clockwise direction. With the main frame or body portion in the position as shown by Fig. 3, the heavy road machine or cargo to be placed thereon, may be readily moved onto the main frame. The windlass may now be operated to draw the forward ends of the side bars downwardly to the position as shown by Fig. 2 of the drawings, with the result that the main frame or body portion will be elevated to its carrying position.

Having thus described the invention, what is claimed is:

1. In a trailer, a main load-supporting frame, a lifting frame embodying elongated side bars having offset rear ends, a stationary transversely disposed hollow shaft secured to and disposed under the main load-supporting frame at a point adjacent to the rear end of the main load-supporting frame, shafts to which the offset ends of said side bars of the lifting frame are connected, said shafts being extended laterally from the lifting frame and mounted in said hollow shaft, a tubular bearing secured over the adjacent ends of the shafts within the hollow shaft, stub axles extending from the side bars on which supporting wheels are mounted, said stub axles having bores in the inner ends thereof, securing pins slidably mounted on the load-supporting frame movable into the bores of the stub axles securing the lifting frame against movement with respect to the main frame and means for moving the elongated side bars vertically, elevating the main load-supporting frame.

2. In a trailer, a main load-supporting frame, a lifting frame embodying elongated side bars having offset rear ends, a stationary transversely disposed hollow shaft secured to and disposed under the main load-supporting frame at a point adjacent to the rear end of the main load-supporting frame, shafts extending inwardly from the offset ends of said elongated side bars, disposed within the ends of said hollow shaft for rotation within the hollow shaft, stub axles extending outwardly from said side bars of the lifting frame at points adjacent to the offset ends thereof, supporting wheels mounted on the stub axles, the forward ends of said elongated side bars extending forwardly a substantial distance terminating adjacent to the forward end of the main load-supporting frame, providing levers, pulleys mounted on the free ends of said side bars of the lifting frame, cables having one of their respective ends connected to said load-supporting frame, said cables operating over said pulleys, and a windlass on which said cables are wound adapted to draw the side bars downwardly, and a crank handle for effecting movement of said windlass.

ARTHUR T. HILL.

REFERENCES CITED

The following references are of record in the file of this patent:

UNITED STATES PATENTS

| Number | Name | Date |
| --- | --- | --- |
| 556,784 | Sweet | Mar. 24, 1896 |
| 1,428,383 | Martin | Sept. 5, 1922 |
| 1,501,996 | Grooms | July 22, 1924 |
| 2,227,762 | Ronning | Jan. 7, 1941 |
| 2,253,217 | Wenthe | Aug. 19, 1941 |
| 2,286,947 | Bankson | June 16, 1942 |
| 2,321,198 | Graves | June 8, 1943 |
| 2,487,701 | Getz | Nov. 8, 1949 |
| 2,513,855 | Fogwell | July 4, 1950 |

FOREIGN PATENTS

| Number | Country | Date |
| --- | --- | --- |
| 469,134 | Great Britain | July 20, 1937 |
| 875,337 | France | June 15, 1942 |